US007967087B2

(12) United States Patent
Arulraja et al.

(10) Patent No.: US 7,967,087 B2
(45) Date of Patent: Jun. 28, 2011

(54) SUSPENSION FOR A MACHINE

(75) Inventors: Mylvaganam Arulraja, Cary, NC (US); Michael S. Freberg, Raleigh, NC (US); Leslie L. Weaver, Jr., Raleigh, NC (US); Michael C. Layko, Apex, NC (US); Jeffrey M. Parker, Fuquay-Varina, NC (US); Michael Bottom, Holly Springs, NC (US)

(73) Assignee: Caterpillar SARL, Geneva (CH)

( * ) Notice: Subject to any disclaimer, the term of this patent is extended or adjusted under 35 U.S.C. 154(b) by 60 days.

(21) Appl. No.: 12/492,398

(22) Filed: Jun. 26, 2009

(65) Prior Publication Data
US 2009/0321152 A1    Dec. 31, 2009

Related U.S. Application Data

(60) Provisional application No. 61/076,311, filed on Jun. 27, 2008.

(51) Int. Cl.
B62D 55/08    (2006.01)
(52) U.S. Cl. ....... 180/9.5; 180/9.46; 180/9.52; 180/9.58
(58) Field of Classification Search ............. 180/9.5, 180/9.46, 9.52, 9.58
See application file for complete search history.

(56) References Cited

U.S. PATENT DOCUMENTS

| 3,601,424 | A | * | 8/1971 | Badland | 280/124.13 |
|---|---|---|---|---|---|
| 4,223,742 | A | * | 9/1980 | Stark | 172/456 |
| 5,788,265 | A | * | 8/1998 | McLaughlin | 280/124.169 |
| 5,842,757 | A | * | 12/1998 | Kelderman | 305/125 |
| 5,988,775 | A | * | 11/1999 | Nordberg | 305/143 |
| 6,247,547 | B1 | | 6/2001 | Lemke et al. | |
| 6,322,171 | B1 | | 11/2001 | Fornes | |
| 6,435,291 | B2 | | 8/2002 | Lemke et al. | |
| 6,435,292 | B2 | | 8/2002 | Lemke et al. | |
| 6,497,460 | B2 | | 12/2002 | Lemke et al. | |
| 6,588,778 | B1 | * | 7/2003 | McLaughlin | 280/124.13 |
| 6,877,728 | B2 | * | 4/2005 | Gehret | 267/279 |
| 6,905,130 | B2 | * | 6/2005 | Few | 280/124.169 |
| 6,913,329 | B1 | | 7/2005 | Rodgers et al. | |
| 7,261,287 | B2 | * | 8/2007 | Gehret | 267/279 |
| 2001/0004947 | A1 | * | 6/2001 | Lemke et al. | 180/9.5 |

(Continued)

FOREIGN PATENT DOCUMENTS

EP            493875           7/1992

(Continued)

*Primary Examiner* — Paul N Dickson
*Assistant Examiner* — Marlon A Arce
(74) *Attorney, Agent, or Firm* — Miller, Matthias & Hull; William A. Beckman

(57) ABSTRACT

A machine is provided. The machine has a forward direction of travel and includes a frame, at least one lift arm, a first torsion axle assembly, an undercarriage, and an endless track. The lift arm is pivotally attached to the frame. The first torsion axle assembly is attached to the frame and includes a first torsion arm, a first torsion shaft, and a first axle, with the first torsion shaft and the first axle extending from the first torsion arm. The undercarriage is attached to the first torsion axle assembly and the endless track encircles the undercarriage. One of the first torsion shaft and the first axle is attached to the frame and the other of the first torsion shaft and the first axle is attached to the undercarriage. The first torsion arm extends upward from the frame at an angle between 90 and 180 degrees from the forward direction of travel.

14 Claims, 10 Drawing Sheets

U.S. PATENT DOCUMENTS

| | | |
|---|---|---|
| 2001/0030068 A1 | 10/2001 | Nagorkca et al. |
| 2001/0040058 A1 | 11/2001 | Lemke et al. |
| 2003/0034189 A1 | 2/2003 | Lemke et al. |
| 2003/0226697 A1 | 12/2003 | Haringer |
| 2004/0099451 A1 | 5/2004 | Nagorcka et al. |
| 2005/0110346 A1 | 5/2005 | Albright et al. |
| 2005/0121207 A1 | 6/2005 | Juncker |
| 2005/0145422 A1 | 7/2005 | Loegering et al. |
| 2005/0231035 A1 | 10/2005 | Vertoni |
| 2005/0252592 A1 | 11/2005 | Albright et al. |

FOREIGN PATENT DOCUMENTS

| | | |
|---|---|---|
| EP | 1523438 | 7/2003 |
| EP | 1564119 | 8/2005 |

* cited by examiner

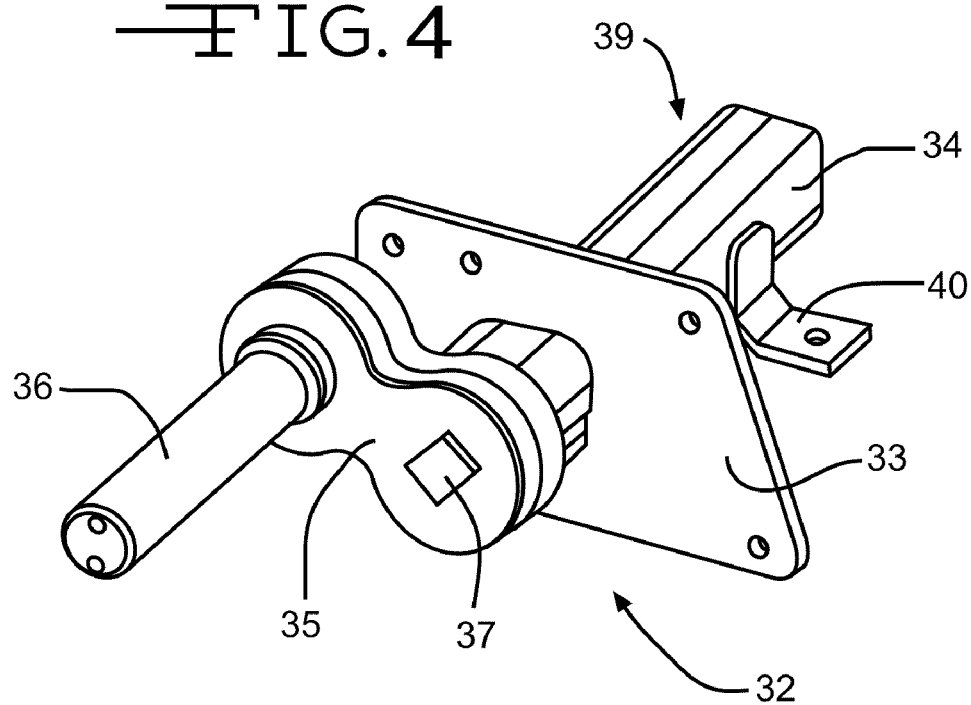
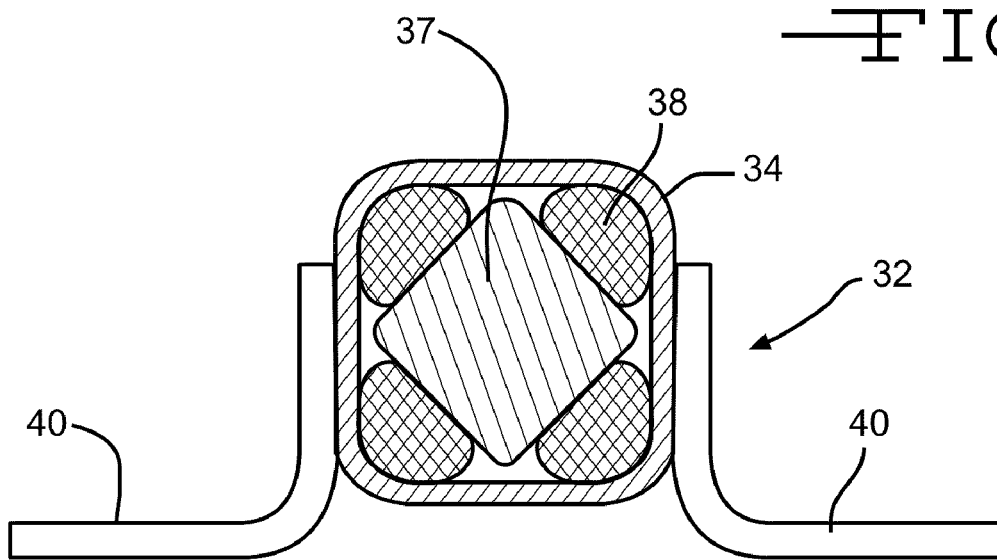

US 7,967,087 B2

SUSPENSION FOR A MACHINE

CLAIM FOR PRIORITY

The present application claims priority from U.S. Provisional Application Ser. No. 61/076,311, filed Jun. 27, 2008, which is fully incorporated herein.

TECHNICAL FIELD

This disclosure relates generally to a suspension for a machine, and more particularly, to a suspension for a tracked skid steer loader.

BACKGROUND

Skid steer loaders are highly maneuverable compact machines used in a variety of applications ranging from asphalt milling to earth moving, depending on the job and type of attachment being used. For applications requiring reduced ground pressure or increased traction, tracked skid steer loaders have been developed. These tracked skid steer loaders, such as compact track loaders and multi-terrain loaders, have rubber-tracked undercarriages that support a machine frame and transfer the powertrain and implement forces to the ground. Typical compact track loaders, which have a rubber over steel track, use a rigid mounting from the undercarriage to the machine frame. While this rigid mounting allows for an efficient transfer of machine power to the implement, it results in an uncomfortable ride for the operator and a reduction in machine performance when the tracks do not maintain full contact with the ground.

Multi-terrain loaders, which use a solid rubber track, have been developed with suspension systems. For example, U.S. Pat. No. 6,435,291 to Lemke et al., entitled Suspension and Drive Mechanism for Multi-Surface Vehicle, ("Lemke"), discloses a tracked vehicle that produces a reduced ground pressure for traveling over soft ground surfaces without damaging the surface. The disclosed track vehicle uses an undercarriage having torsion axles arranged in a five-bar linkage with the machine frame.

While this configuration may work adequately for applications seeking a reduced ground pressure, the five-bar linkage suspension disclosed in Lemke may not be suitable for applications requiring an efficient transfer of machine power to the implement, such as grading.

SUMMARY

In one aspect of the present disclosure, a machine is provided. The machine has a forward direction of travel and includes a frame, at least one lift arm, a first torsion axle assembly, an undercarriage, and an endless track. The lift arm is pivotally attached to the frame. The first torsion axle assembly is attached to the frame and includes a first torsion arm, a first torsion shaft, and a first axle, with the first torsion shaft and the first axle extending from the first torsion arm. The undercarriage is attached to the first torsion axle assembly and the endless track encircles the undercarriage. One of the first torsion shaft and the first axle is attached to the frame and the other of the first torsion shaft and the first axle is attached to the undercarriage. The first torsion arm extends upward from the frame at an angle between 90 and 180 degrees from the forward direction of travel.

In another aspect of the present disclosure, a suspension for a machine is provided. The machine has a forward direction of travel, a frame, at least one lift arm pivotally attached to the frame, an undercarriage supporting the frame, and an endless track encircling the undercarriage. The suspension includes a first torsion axle assembly and a second torsion axle assembly. The first torsion axle assembly is configured to be attached to the frame and attached to the undercarriage and includes a first torsion arm, a first torsion shaft, and a first axle. The first torsion shaft and the first axle extend from the first torsion arm. The second torsion axle assembly is configured to be attached to the frame and attached to the undercarriage and includes a second torsion arm, a second torsion shaft, and a second axle. The second torsion shaft and the second axle extend from the second torsion arm. The second torsion axle assembly is positioned rearward of the first torsion axle assembly along the forward direction of travel. One of the first torsion shaft and the first axle is configured to be attached to the frame and the other of the first torsion shaft and the first axle is attached to the undercarriage. The first torsion arm extends upward from the frame at an angle between 90 and 180 degrees from the forward direction of travel.

In a third aspect of the present disclosure, a method of providing a suspension for a machine is provided. The machine has a forward direction of travel and an undercarriage, and at least one lift arm attached to a frame of the machine. The method also includes the step of providing a first torsion axle assembly including a first torsion arm, a first torsion shaft, and a first axle. The first torsion shaft and the first axle extend from the first torsion arm. The method also includes the step of attaching one of the first torsion shaft and the first axle to the frame and the other of the first torsion shaft and the first axle to the undercarriage such that the first torsion arm extends upward from the frame at an angle between 90 and 180 degrees from the forward direction of travel.

BRIEF DESCRIPTION OF THE DRAWINGS

FIG. 4 is a perspective view of the front torsion axle of FIG. 3;

FIG. 5 is cross-section view of the torsion shaft of the front torsion axle of FIG. 4;

DETAILED DESCRIPTION

Figure 1:
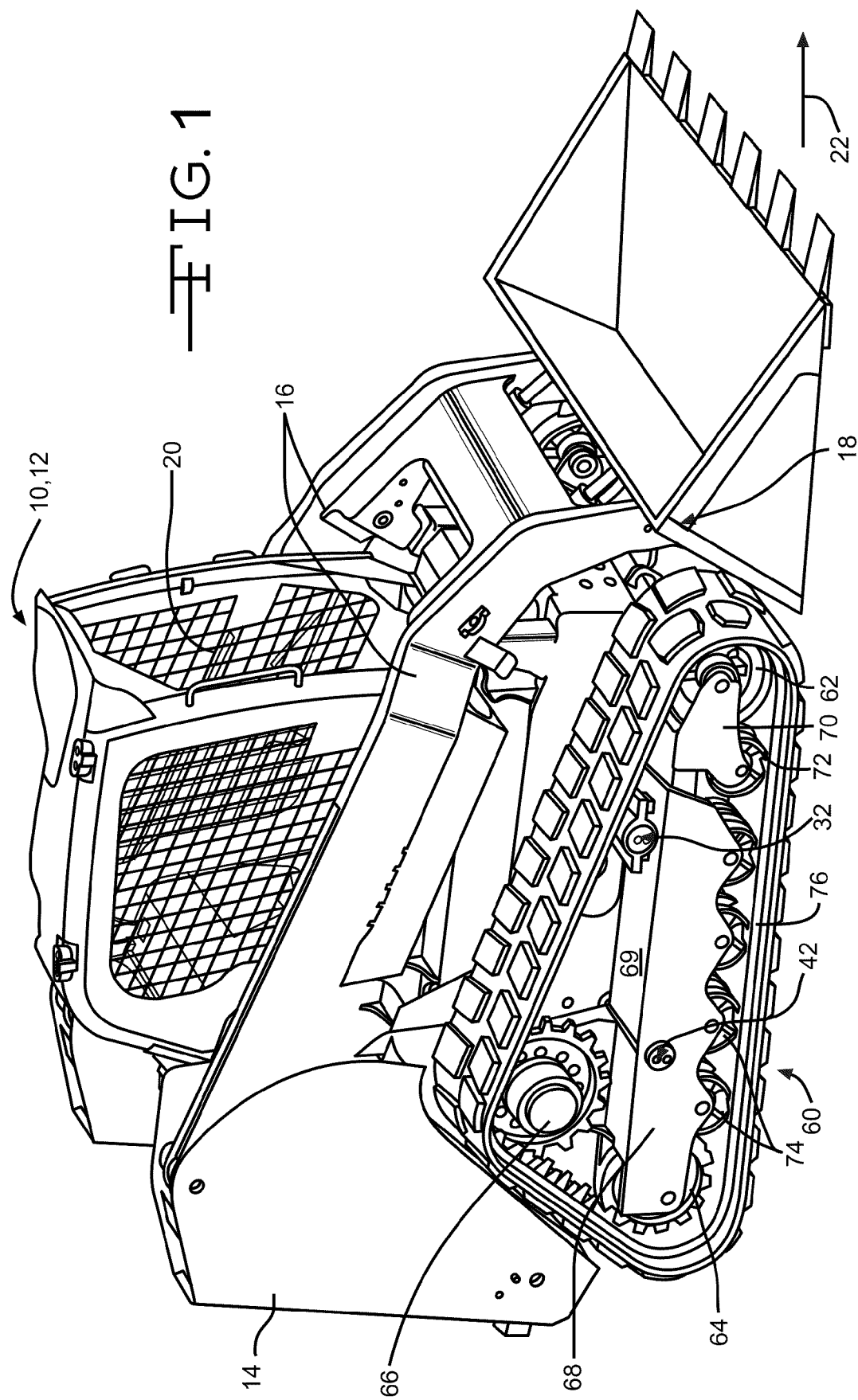
FIG. 1 is a perspective view of a machine having a suspension system suitable for use with the present disclosure.

A machine 10, such as a compact track loader 12, in accordance with the present disclosure is illustrated in FIG. 1. As shown, the machine 10 has a forward direction of travel 22 and includes a machine frame 14, an operator compartment 20, and a pair of lift arms 16 pivotally attached to the machine frame 14. The lift arms 16 are shown pivotally mounted to a rear portion of the machine frame 14, behind the operator compartment 20 with respect to the forward direction of travel 22. An implement 18, shown as a bucket, is coupled to the lift arms 16.

Figure 2:
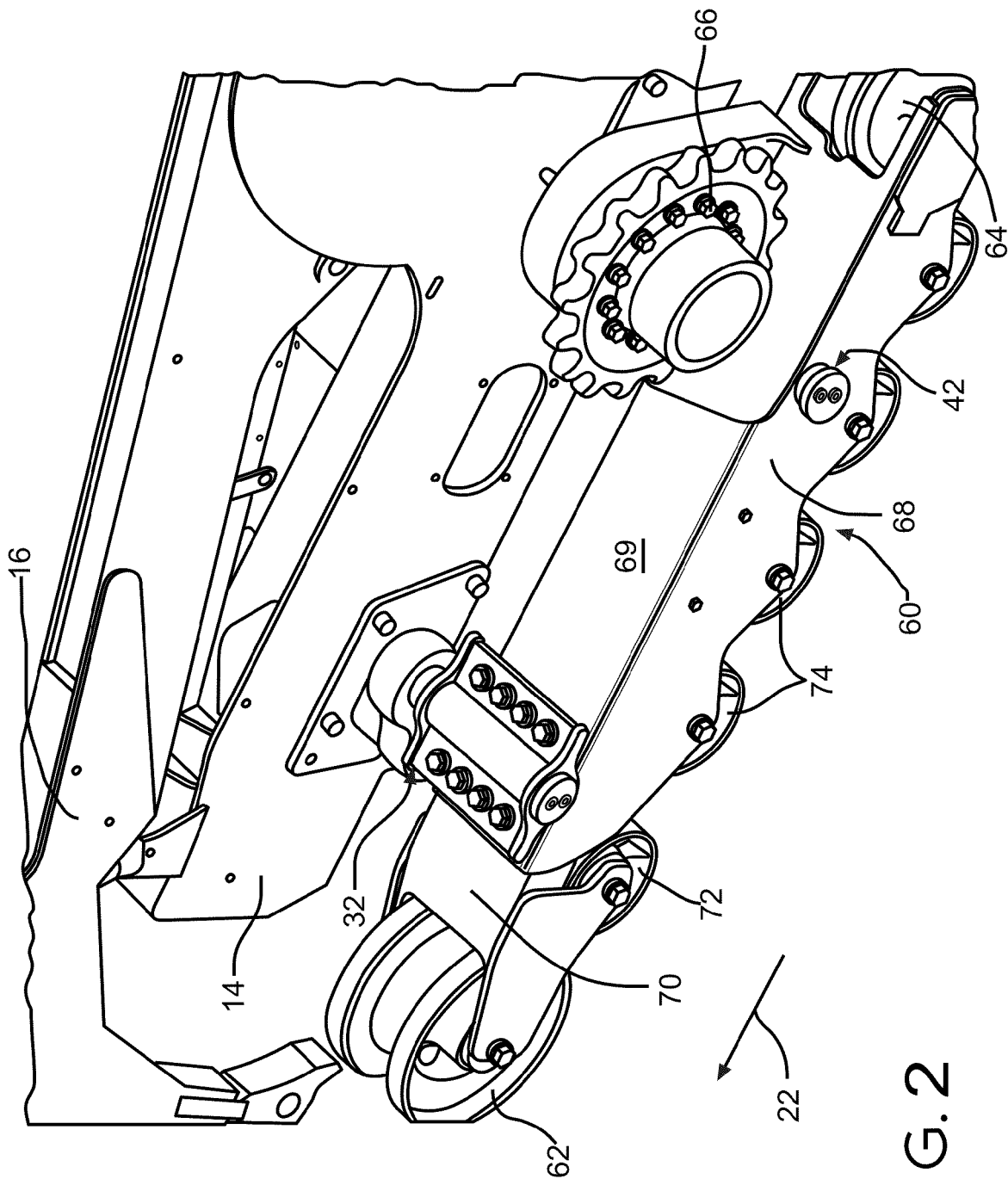
FIG. 2 is a perspective view of the undercarriage of the machine of FIG. 1, with the endless track shown removed.

The machine frame 14 is mounted to an undercarriage 60 through a suspension system 30 (shown in FIG. 3) including a pair of first and second torsion axle assemblies 32, 42 (only one side shown). As seen in FIGS. 1-2, the undercarriage 60 includes a front and a rear idler 62, 64, a drive sprocket 66, a roller frame 68, a moveable frame 70, a first roller 72, and a plurality of rollers 74. The rear idler 64 and the plurality of rollers 74 are rotatably mounted to the roller frame 68. The drive sprocket 66 is rotatably mounted to an upper surface 69 of the roller frame 68. The front idler 62 and the first roller 72 are rotatably mounted to the moveable frame 70. The moveable frame 70 is translatably attached to the roller frame 68. A grease ram (not shown) or other track recoil system may be used to absorb any recoil or track length changes. As illustrated in FIGS. 1-2, the rear idler 64 and the drive sprocket 66 are fixed with respect to the roller frame 68, while the front idler 62 and the first roller 72 are moveable with respect to the roller frame 68.

As seen in FIG. 1, an endless track 76 encircles the undercarriage 60. Specifically, the endless track 76 encircles the front idler 62, the rollers 72, 74, the rear idler 64, and the drive sprocket 66. The rollers 72, 74 distribute the weight of the machine 10 and implement 18 uniformly over the endless track 76. The endless track 76 may be a compact track loader track, having a rubber over steel drive lug construction. Alternatively, the endless track 76 may be a solid rubber track having reinforcing belts or transverse rods, such as a multi-terrain loader track having rubber drive lugs, or a steel track consisting of a steel link assembly with steel track shoes.

Figure 3:
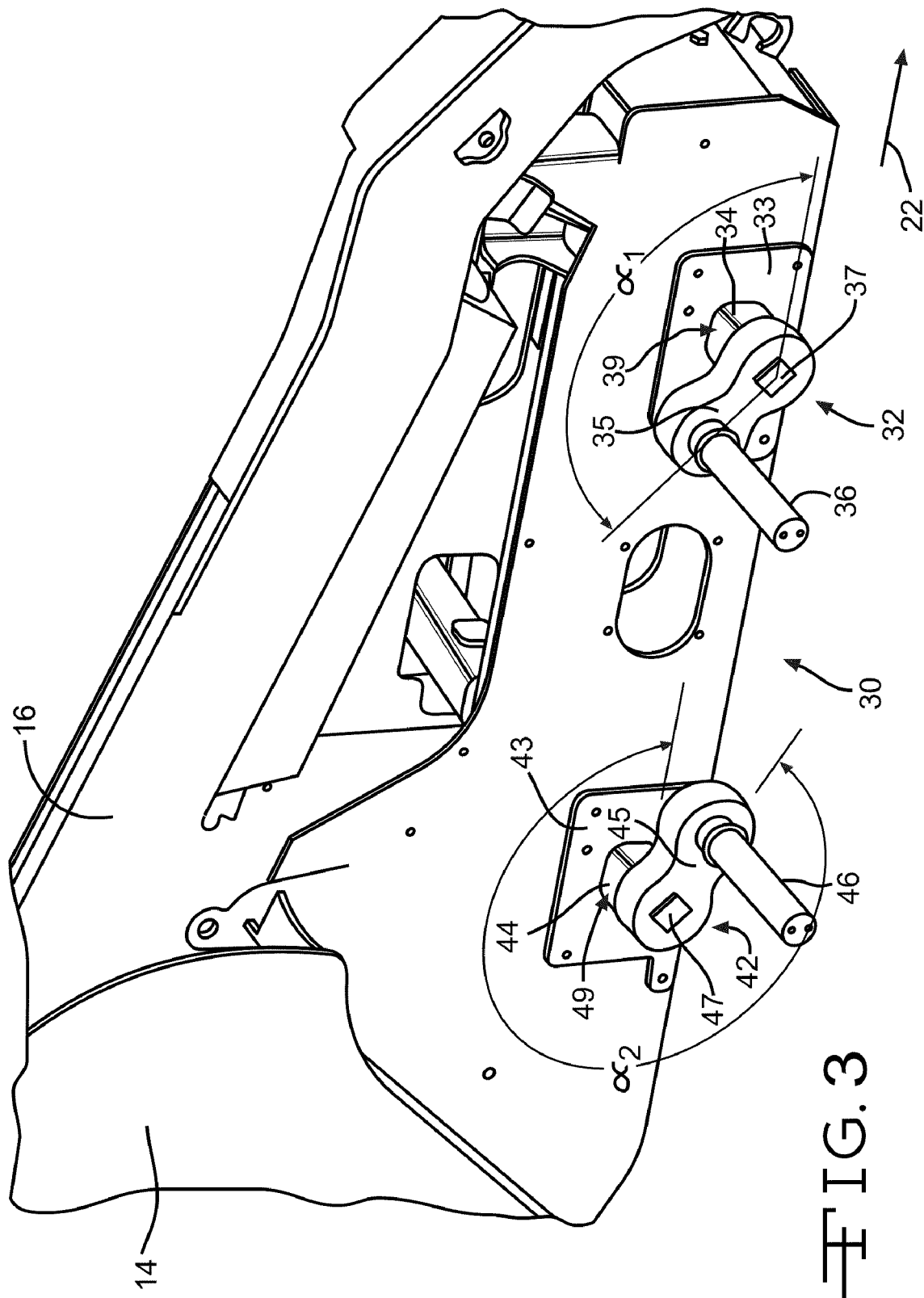
FIG. 3 is a perspective view of the machine of FIG. 1, with the undercarriage shown removed.

Referring now to FIG. 3, the suspension system 30 of the machine 10 is illustrated. The suspension system 30 includes the pair of front torsion axle assemblies 32 and the pair of rear torsion axle assemblies 42 (with only one side shown). Each torsion axle assembly 32, 42 includes a mounting flange 33, 43, a torsion arm 35, 45, a torsion shaft 39, 49, and an axle 36, 46. The mounting flanges 33, 43 are attached to the machine frame 14 and rotationally lock the torsion shafts 39, 49. Each torsion shaft 39, 49 is mounted to and extends from one end of its respective torsion arm 35, 45. The axles 36, 46 extend from the other end of the torsion arms 35, 45. As seen in FIG. 3, the intersection of the front torsion arm 35 and the forward direction of travel 22 centered about the frame 14 forms a counterclockwise angle of $\alpha 1$. Described another way, the first torsion arm 35 extends upward from the frame 14 at an angle of $\alpha 1$ from the forward direction of travel 22. As described in detail below, $\alpha 1$ may be an angle between 90 and 180 degrees. In another embodiment, $\alpha 1$ may more particularly be an angle between 120 and 150 degrees. In general, it may be desired to keep $\alpha 1$ away from the endpoints of a quadrant range (i.e. 90, 180, 270, and 360 degrees) to prevent the four-bar suspension linkage formed by the machine frame 14, the undercarriage 60, and the front and rear torsion arms 35, 45 from going over center and locking up, or from undesirable machine oscillations.

Similarly, as seen in FIG. 3, the intersection of the rear torsion arm 45 and the forward direction of travel 22 centered about the frame 14 forms a counterclockwise angle of $\alpha 2$. Alternately phrased, the second torsion arm 45 extends downward from the frame 14 at an angle of $\alpha 2$ from the forward direction of travel 22. As illustrated in FIG. 3, $\alpha 2$ is an angle between 270 and 360 degrees, and in another embodiment, $\alpha 2$ may more particularly be an angle between 300 and 330 degrees. However, depending on space constraints and application, the angle $\alpha 2$ may also be an angle between 90 and 180 degrees, and in another embodiment, may more particularly be an angle between 120 and 150 degrees. In order for the four-bar suspension linkage formed by the machine frame 14, the undercarriage 60, and the front and rear torsion arms 35, 45 to function correctly, if $\alpha 1$ is an angle between 90 and 180 degrees as stated above, $\alpha 2$ should be an angle between 270 and 360 degrees or between 90 and 180 degrees. The measurement of $\alpha 1$ and $\alpha 2$ may be done while the implement 18 of the machine 10 is in an unloaded state and the machine 10 is stationary on level ground. In one application, the torsion arms 35, 45 have a length of 6 inches, measured from the center of the torsion shafts 39, 49 to the center of the axles 36, 46, although other lengths may be used for other applications, depending on the desired suspension travel, space constraints, and machine loading versus spring capability.

FIGS. 4-5 illustrate the details of the torsion axle assemblies 32, 42. The torsion shaft 39 of the torsion axle assembly 32 has a hollow outer tube 34, 44 attached to the machine frame 14 via the mounting flange 33, 43 and brackets 40. An inner square bar 37, 47 and rubber cords 38 are positioned within the outer tube 34, 44. The inner square bar 37, 47 is rotationally attached to one end of the torsion arms 35, 45. As the torsion arms 35, 45 are rotated by movement of the undercarriage 60 and the axles 36, 46, the inner square bars 37, 47 also rotate. This rotation of the inner square bars 37, 47 is resisted by the rubber cords 38, which are fixed with respect to the outer tubes 34, 44 and exert a biasing torque on the inner square bar 37, 47 and the torsion arms 35, 45.

Referring back to FIG. 2, the axles 36, 46 that extend from the other end of the torsion arms 35, 45 are attached to the undercarriage 60 at the roller frame 68. The axle 36 is shown attached to the upper surface 69 of the roller frame 68, while the axle 46 is attached to and extends through the roller frame 68, although there are many other methods of attaching the axles 36, 46 to the roller frame 68.

The machine 10 also includes an engine that powers a drive system (neither shown). The engine is attached to the rear of the machine frame 14 with respect to the forward direction of travel 22. The engine may be a diesel engine or any other engine known in the art, such as a gasoline engine, a gaseous fuel driven engine, or any other engine known in the art. It is also contemplated that the engine may alternately include another source of power such as a fuel cell, a power storage device, an electric or hydraulic motor, and/or another source of power known in the art. The engine may be operatively connected to the drive system by any suitable manner known in the art, such as, for example, gearing, a countershaft, and/or a belt.

The drive system (not shown) in the machine 10 may be a dual-path hydrostatic transmission, although other transmissions known in the art may also be used, such as a mechanical or electrical variable-speed drive or gear-type transmissions. The drive system may include a pair of variable displacement pumps and a left and a right drive motor coupled to the drive sprocket 66. The variable displacement pumps supply pressurized hydraulic fluid through supply lines to drive the left and right drive motors, which turn the drive sprockets 66.

Industrial Applicability

The disclosed suspension system for a machine may be used to provide a suspension for any tracked machine having an implement that is raised and lowered to perform a desired task. In one exemplary embodiment, the suspension system is for a compact track loader.

During operation of the machine 10, an operator (not shown) can independently control the speed and direction of the left and right endless tracks 76 (only one side shown) to control the speed and direction of the machine 10. The engine supplies power to the variable displacement pumps of the drive system, which supply pressurized hydraulic fluid to the drive motors and turn the drive sprockets 66.

Figure 6:
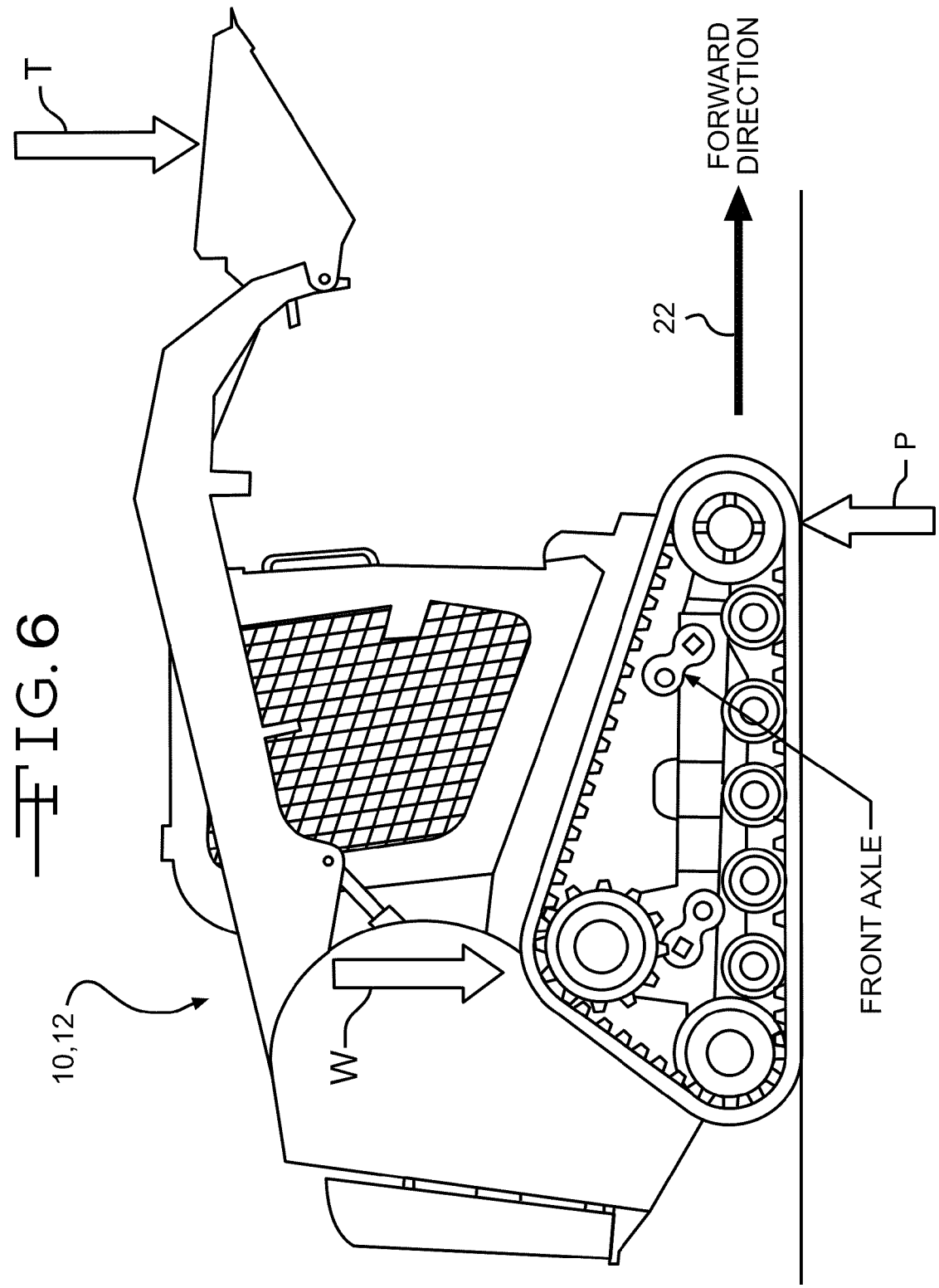
FIG. 6 is a diagram illustrating the forces acting on a machine of FIG. 1 as the machine raises its implement.

As the machine 10 travels over uneven ground, impacts to the undercarriage 60 may be absorbed by the suspension system 30 before reaching the machine frame 14 and operator compartment 20. The torsion axle assemblies 32, 42 of the suspension system are oriented to provide good machine tipping characteristics while at the same time good suspension characteristics. FIGS. 6, 6A-6D and FIG. 7 illustrate the effects of machine tipping and load characteristics as the torsion arms 35, 45 are in varying angular orientations. FIG. 6 is a diagram illustrating the tipping load "T," the machine weight "W" applied to the machine center of gravity, and the reaction tipping force "P" about the front idler 62. The combined force of T+W is applied to the torsion shaft 39, 49 of the torsion axle assembly 32, 42, while the reaction tipping force F is applied to the axle 36, 46 of the torsion axle assembly 32, 42 in FIGS. 6A-6B, described below.

Figure 6A:
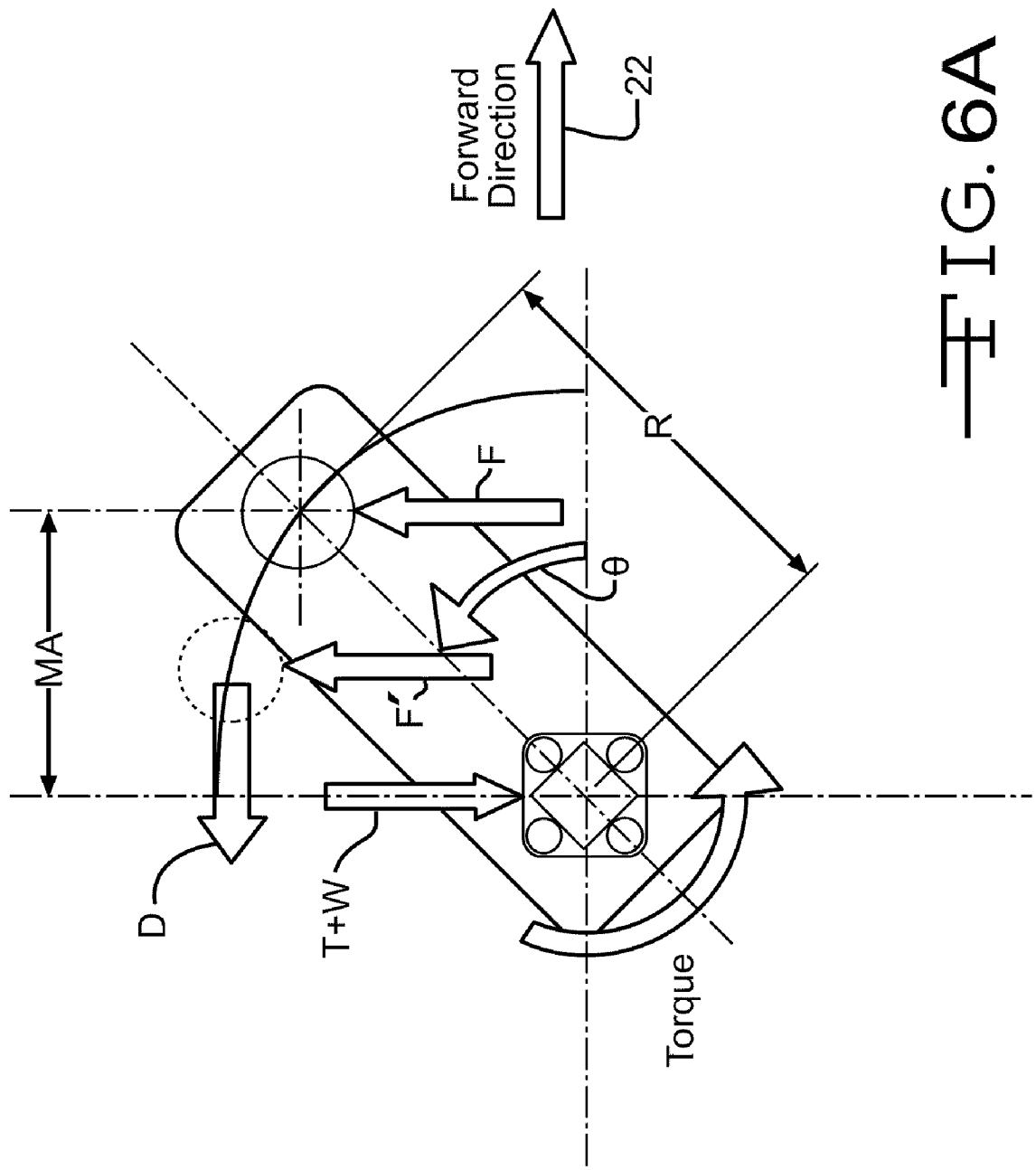
FIG. 6A is a diagram showing the forces on a torsion axle oriented in the first quadrant.

FIG. 6A is a free body diagram illustrating the forces on a torsion axle assembly 32, 42 oriented in the first quadrant, with the intersection of the torsion arm 35, 45 and the forward direction of travel 22 centered about the frame 14 forming a counterclockwise angle between 0 and 90 degrees, measured by the angle "θ". The distance "R" is the length of the torsion arm 35, 45 as measured by the distance between the center point of the torsion shaft 39, 49 and the center point of the axle 36, 46. The Moment Arm "MA" is the horizontal distance between the center point of the torsion shaft 39, 49 and the center point of the axle 36, 46, and may be calculated by the formula: MA=R cosine θ. "F" is the reaction force from the undercarriage 60 applied to the axle 36, 46 of the torsion axle assembly 32, 42. As F is applied to the torsion axle assembly 32, 42, it creates a torque about the torsion shaft 39, 49, and may be calculated by the formula: Torque=F×MA. Similarly, "F'" is the reaction force from the undercarriage 60 applied to the axle of the torsion axle assembly when the torsion arm is at a second angular position, when the machine is in a loaded state. "D" is the direction that the axle has moved with respect to the forward direction of travel 22.

Figure 7:
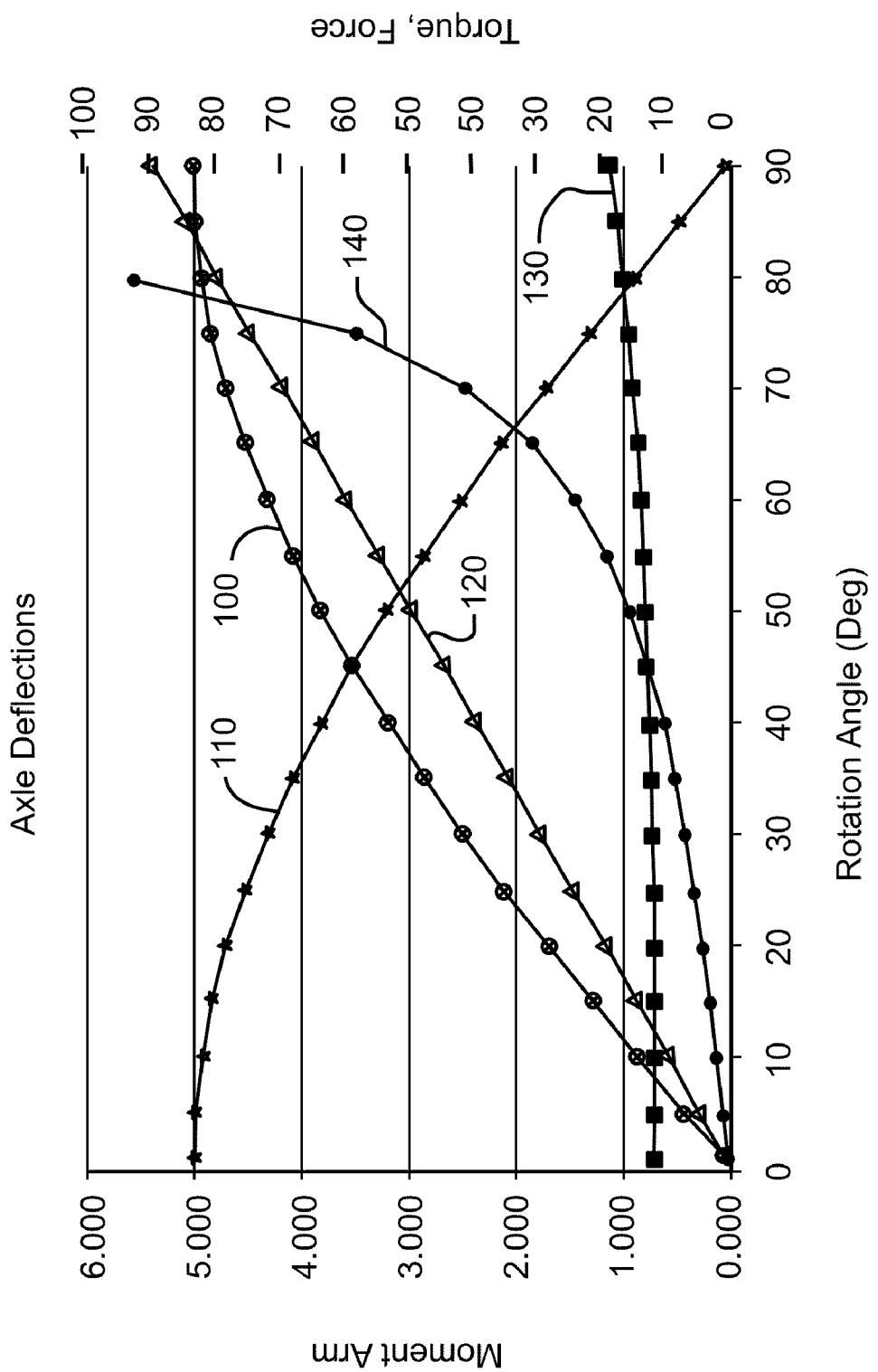
FIG. 7 is a graph showing the Moment Arms, Torques, and Forces of FIGS. 6A-6D plotted against rotation angle deflection of a torsion axle in degrees.

FIG. 7 plots F, Torque, and MA versus rotation angle θ of FIG. 6A in plots 140, 120, and 110, respectively. From the FIG. 7 plots, several conclusions may be drawn. From the plot of 120, Torque versus rotation angle θ is shown to have a linear response, so that as the rotation angle θ of the torsion arm 35, 45 increases, the reaction torque increases at the same rate. For simplification purposes, this is an assumed characteristic of the torsion spring in the axle; the actual spring rate can vary from this assumption without significantly affecting the stated conclusions. Next, plot 110 follows a cosine relationship as the moment arm MA is plotted against the rotation angle θ. When the force F is plotted against the rotation angle θ in plot 140, calculated by the formula F=Torque/MA, a rising force curve is shown. This rising force curve is desirable as it takes an increasing reaction force from the interaction of the undercarriage 60 and the ground to cause an increase in the deflection of the torsion arms 35, 45.

However, positioning a torsion arm 35, 45 with a first quadrant orientation, so that it extends upward from the frame 14 at an angle between 0 and 90 degrees from the forward direction of travel 22, may not be ideal when the tipping point of the machine 10 is analyzed. As seen when the suspension of a torsion arm 35, 45 is loaded, the reaction force at the loaded point F' shifts rearward along direction "D" relative to the forward direction of travel 22. This rearward shift "D" of the reaction force F is not desirable as it becomes easier for a machine to tip about the front idler 62 as the lift arms 16 are raised with a tipping load.

Figure 6B:
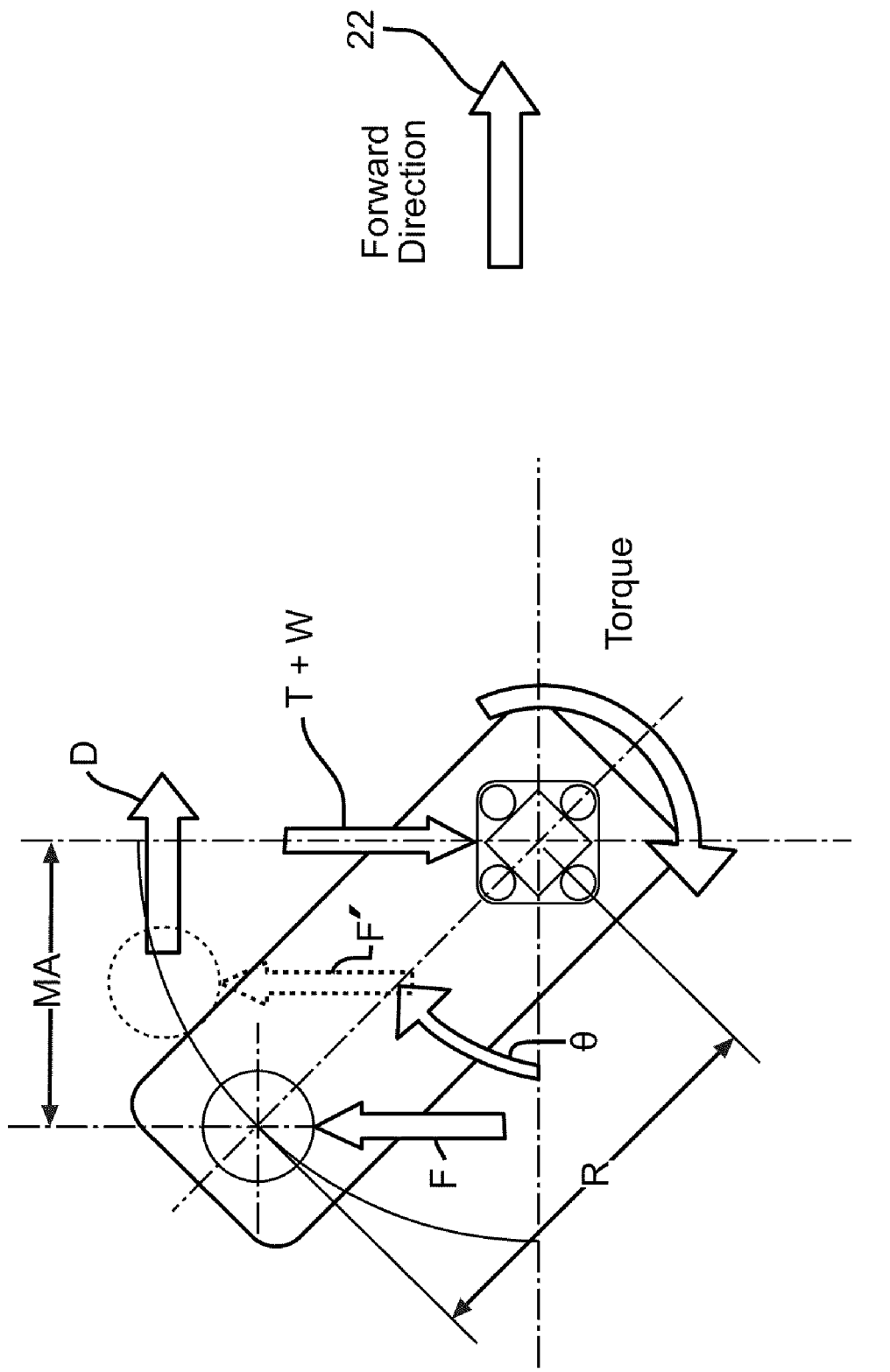
FIG. 6B is a diagram showing the forces on a torsion axle oriented in the second quadrant.

FIG. 6B is a free body diagram showing the forces on a torsion axle assembly 32, 42 oriented in the second quadrant, with the intersection of the torsion arm 35, 45 and the forward direction of travel 22 centered about the frame 14 forming a counterclockwise angle between 90 and 180 degrees. The angle "θ" is the angle between MA and R, and supplementary to α1 or α2 (as seen in FIG. 3). The plots of F, Torque, and MA versus rotation angle θ (140, 120, 100) are identical to those described for FIG. 6A, above, with a rising force curve. This rising force curve is desirable as it takes an increasing reaction force from the interaction of the undercarriage 60 and the ground to cause an increase in the deflection of the torsion arms 35, 45.

However, in contrast to a first quadrant orientation, positioning a torsion arm 35, 45 with a second quadrant orientation provides an improved tipping point response as the suspension is loaded. As seen when the suspension of a torsion arm 35, 45 is loaded, the reaction force at the loaded point F' shifts forward relative to the load. This forward shift of the reaction force is desirable as it becomes harder for the machine 10 to tip about the front idler 62 as the lift arms 16 are raised with a tipping load. As a result of this and the rising force curve, this orientation is adopted for the front torsion axle assembly 32.

Figure 6C:
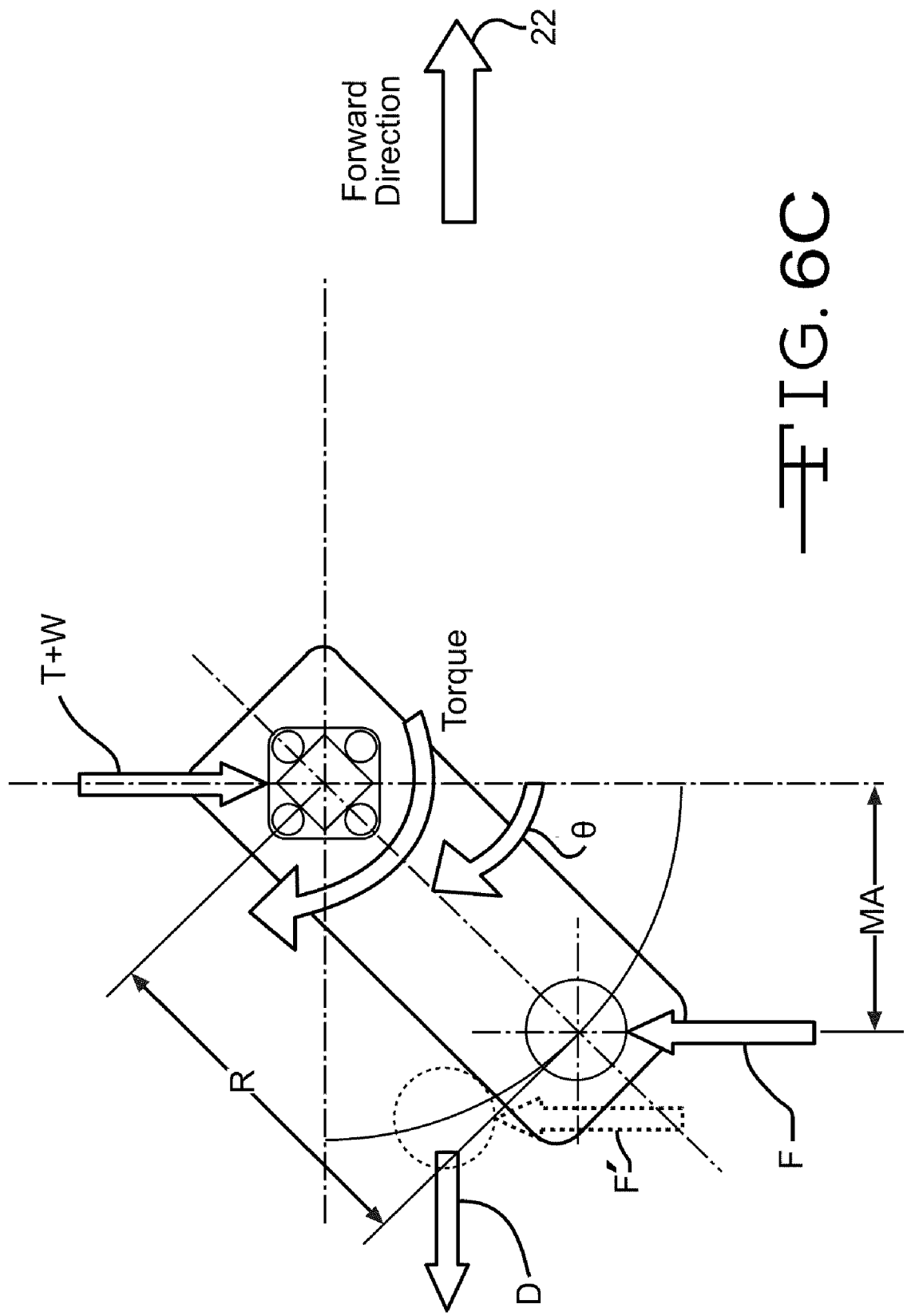
FIG. 6C is a diagram showing the forces on a torsion axle oriented in the third quadrant.

FIG. 6C is a diagram showing the forces on a torsion axle assembly 32, 42 oriented in the third quadrant, with the intersection of the torsion arm 35, 45 and the forward direction of travel 22 centered about the torsion shaft 39, 49 forming an angle between 180 and 270 degrees. The angle "θ" is the angle formed by the intersection of the vertical axis and R. Unlike FIGS. 6A-6B, the moment arm MA is calculated by the formula: MA=R sine θ. This results in new plots of MA and F versus rotation angle θ (plots 100 and 130, respectively, in FIG. 7), while the plot of the Torque curve 120 remains the same as described above. From these FIG. 7 plots, several conclusions may be drawn. Because plot 100 follows a sine relationship as the moment arm MA is plotted against the rotation angle θ, when the force F is plotted against the rotation angle θ (plot 130), a flat force curve is shown. This flat force curve is not desirable as it leads to a soft suspension, with minor changes in reaction force from the interaction of the undercarriage 60 and the ground causing large deflections in the torsion arms 35, 45.

As described above for FIG. 6A, positioning a torsion arm with a third quadrant orientation may not be ideal when the tipping point of the machine is analyzed. As seen when the suspension of a torsion arm is loaded, the reaction force at the loaded point F' shifts rearward along D relative to the load. This rearward shift of the reaction force is not desirable as it becomes easier for a machine to tip about the front idler 62 as the lift arms 16 are raised with a tipping load.

Figure 6D:
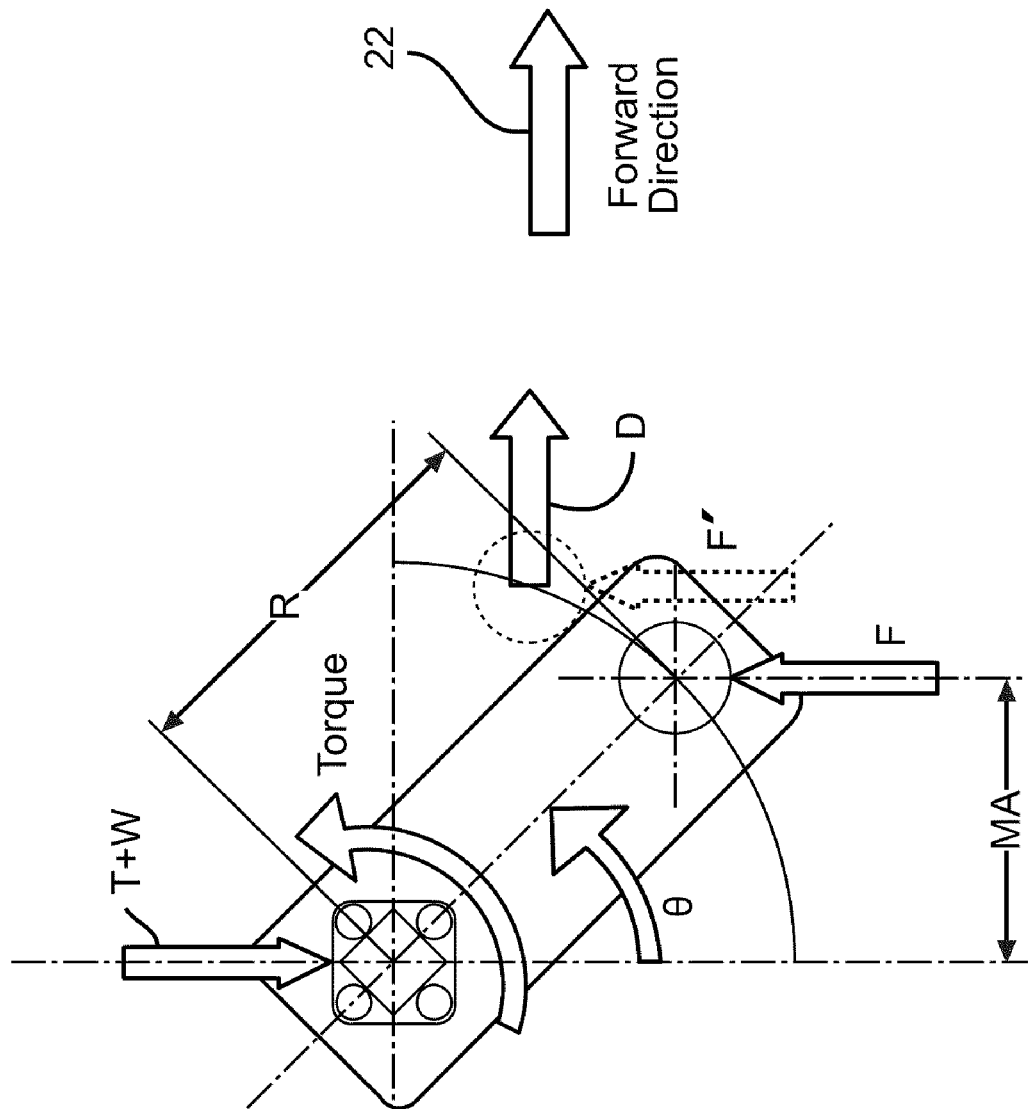
FIG. 6D is a diagram showing the forces on a torsion axle oriented in the fourth quadrant.

FIG. 6D is a diagram showing the forces on a torsion axle assembly 32, 42 oriented in the fourth quadrant, with the intersection of the torsion arm 35, 45 and the forward direction of travel 22 centered about the torsion shaft 39, 49 forming an angle between 270 and 360 degrees. The angle "θ" is the angle formed by the intersection of the vertical axis and R. As with FIG. 6C above, the moment arm MA is calculated by the formula: MA=R sine θ. While this results in a flat force curve as with third quadrant orientations, the tipping point characteristics are desirable. As described above for FIG. 6B, positioning a torsion arm with a fourth quadrant orientation provides an improved tipping point response as the suspension is loaded. As seen when the suspension of a torsion arm 35, 45 is loaded, the reaction force at the loaded point F' shifts forward along D relative to the load. This forward shift of the reaction force is desirable as it becomes harder for a machine to tip about the front idler 62 as the lift arms 16 are raised with a tipping load.

This configuration of the suspension system 30, with a second quadrant front torsion arm 35 orientation and a fourth quadrant rear torsion arm 45 orientation, allows for both a rising force curve and improved tipping characteristics with the front torsion arm 35, and improved tipping characteristics with the rear torsion arm 45. The rising force curve versus torsion arm angular deflection is desirable for machine applications where a suspension system is desired, but the machine application requires stiffness between the implement and the undercarriage. Examples requiring a suspension but stiffness between the implement and undercarriage are grading or other applications requiring fine control of a work tool and high loads at the front of the machine. The disclosed suspension system provides both a comfortable ride for the operator and acceptable machine performance in its intended applications. Moreover, the suspension system can be configured with a simpler four-bar linkage, provided attention is paid to the torsion axle orientations.

While the disclosure has been described with reference to details of the illustrated embodiments, these details are not intended to limit the scope of the disclosure as defined in the appended claims. For example, suspension systems with both torsion arms having second quadrant orientations, or with either the front or rear torsion arm having a second quadrant orientation may also be provided. Moreover, for applications having higher loads at the rear of the machine, such as tracked agricultural tractors, it may be desirable to position the rear torsion arm in the first quadrant and the front torsion arm in either the first or third quadrant. Other aspects, objects and advantages of this disclosure can be obtained from a study of the drawings, the disclosure, and the appended claims.

What is claimed is:

1. A machine having a forward direction of travel comprising:
    a frame;
    at least one lift arm pivotally attached to the frame;
    a first torsion axle assembly attached to the frame and including a first torsion arm, a first torsion shaft and a first axle, wherein the first torsion shaft and the first axle extend from the first torsion arm;
    an undercarriage attached to the first torsion axle assembly;
    an endless track encircling the undercarriage;
    wherein one of the first torsion shaft and the first axle is attached to the frame and the other of the first torsion shaft and the first axle is attached to the undercarriage, and the first torsion arm extends upward from the frame at an angle between 90 and 180 degrees from the forward direction of travel and;
    a second torsion axle assembly attached to the frame and the undercarriage and including a second torsion arm, a second torsion shaft, and a second axle, wherein the second torsion shaft and the second axle extend from the second torsion arm, the second torsion axle assembly positioned rearward of the first torsion axle assembly along the forward direction of travel, wherein one of the second torsion shaft and the second axle is attached to the frame and the other of the second torsion shaft and the second axle is attached to the undercarriage, and the second torsion arm extends downward from the frame at an angle between 270 and 360 degrees from the forward direction of travel, and wherein the undercarriage has a roller frame and the first axle is attached to an upper surface of the roller frame and the second axle extends through the roller frame.

2. The machine of claim 1, wherein the first torsion arm extends upward from the frame at an angle between 120 and 150 degrees from the forward direction of travel.

3. The machine of claim 1, wherein the second torsion arm extends downward from the frame at an angle between 300 and 330 degrees.

4. The machine of claim 1, wherein the first torsion shaft and the second torsion shaft are attached to the frame and the first axle and the second axle are attached to the undercarriage.

5. The machine of claim 1, wherein one of the second torsion shaft and the second axle is attached to the frame and the other of the second torsion shaft and the second axle is attached to the undercarriage, and the second torsion arm extends upward from the frame at an angle between 90 and 180 degrees from the forward direction of travel.

6. The machine of claim 1, further comprising an implement coupled to the at least one lift arm and wherein the machine is in an unloaded state.

7. The machine of claim 1, wherein the undercarriage further comprises:
    a roller frame;
    a plurality of rollers rotatably attached to the roller frame;
    a rear idler rotatably attached to the roller frame;
    a drive sprocket rotatably attached to the roller frame;
    a moveable frame translatably attached to the roller frame,
    a front idler rotatably attached to the moveable frame; and
    a front roller rotatably attached to the moveable frame.

8. The machine of claim 7, wherein the drive sprocket is rotatably attached to an upper surface of the roller frame.

9. A suspension for a machine having a forward direction of travel, a frame, at least one lift arm pivotally attached to the frame, an undercarriage supporting the frame, and an endless track encircling the undercarriage, comprising:
    a first torsion axle assembly configured to be attached to the frame and attached to the undercarriage and including a first torsion arm, a first torsion shaft, and a first axle, wherein the first torsion shaft and the first axle extend from the first torsion arm; and
    a second torsion axle assembly configured to be attached to the frame and attached to the undercarriage and including a second torsion arm, a second torsion shaft, and a second axle, wherein the second torsion shaft and the second axle extend from the second torsion arm, the second torsion axle assembly positioned rearward of the first torsion axle assembly along the forward direction of travel;
    wherein one of the first torsion shaft and the first axle is configured to be attached to the frame and the other of the first torsion shaft and the first axle is attached to the undercarriage, and the first torsion arm extends upward from the frame at an angle between 90 and 180 degrees from the forward direction of travel, and wherein the undercarriage has a roller frame and the first axle is attached to an upper surface of the roller frame and the second axle extends through the roller frame.

10. The suspension of claim 9, wherein one of the second torsion shaft and the second axle is configured to be attached to the frame and the other of the second torsion shaft and the second axle is attached to the undercarriage, and the second torsion arm extends downward from the frame at an angle between 270 and 360 degrees from the forward direction of travel.

11. The suspension of claim 9, wherein the first torsion shaft and the second torsion shaft are configured to be attached to the frame and the first axle and the second axle are attached to the undercarriage.

12. A method of providing a suspension for a machine having a forward direction of travel, an undercarriage, and at least one lift arm attached to a frame of the machine, comprising the steps of:

providing a first torsion axle assembly including a first torsion arm, a first axle, and a first torsion shaft, the first axle and the first torsion shaft extending from the first torsion arm;

attaching one of the first torsion shaft and the first axle to the frame and the other of the first torsion shaft and the first axle to the undercarriage such that the first torsion arm extends upward from the frame at an angle between 90 and 180 degrees from the forward direction of travel;

providing a second torsion axle assembly including a second torsion arm, a second axle, and a second torsion shaft, the second axle and the second torsion shaft extending from the second torsion arm;

attaching one of the second torsion shaft and the second axle to the frame and the other of the second torsion shaft and the second axle to the undercarriage such that the second torsion arm extends downward from the frame at an angle between 270 and 360 degrees from the forward direction of travel;

attaching the first axle to an upper surface of the roller frame; and attaching the second axle to the roller frame such that the second axle extends through the roller frame.

13. The method of claim 12, wherein the first torsion shaft and the second torsion shaft are attached to the frame and the first axle and the second axle are attached to the undercarriage.

14. The method of claim 12, further comprising the step of:

providing an implement attached to the at least one lift arm of the machine.

\* \* \* \* \*